3,282,608
TILT-LOCKING FIFTH WHEELS
Ray A. Braunberger, 221 N. La Salle St., Chicago, Ill.
Filed Aug. 28, 1964, Ser. No. 392,771
2 Claims. (Cl. 280—438)

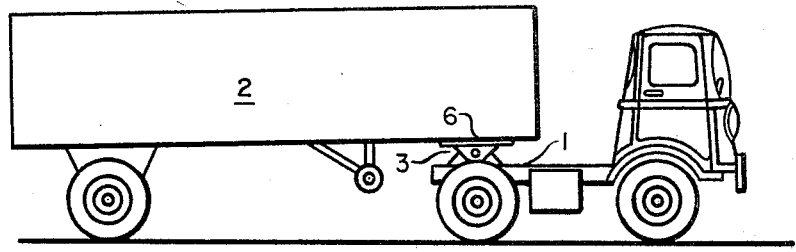
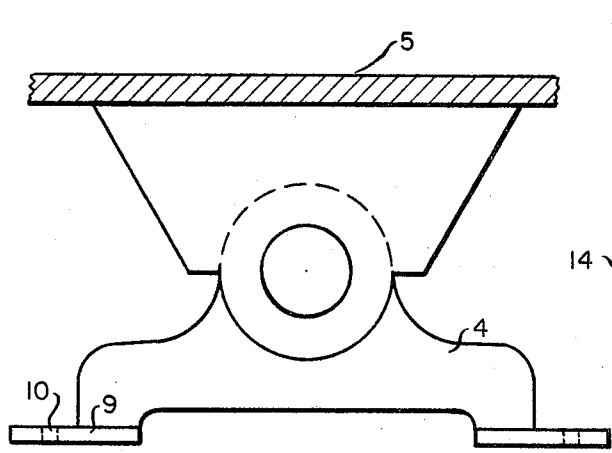
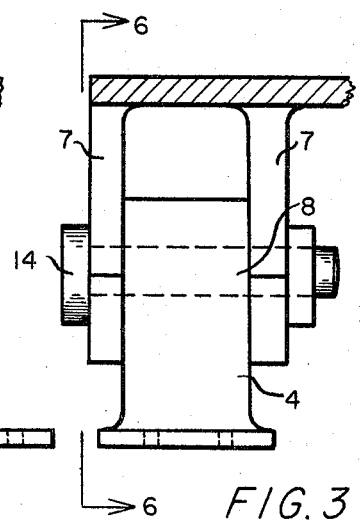
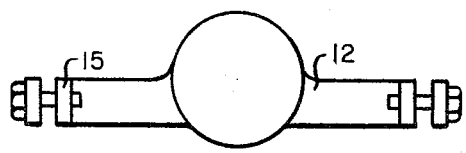
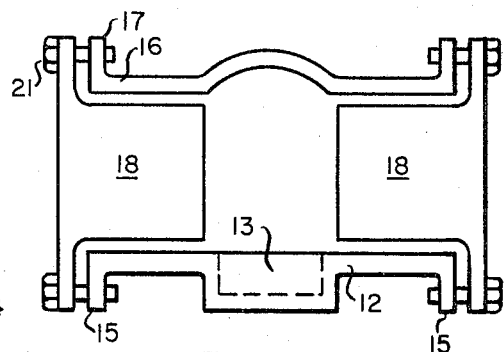
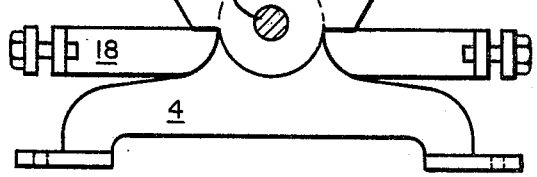

The invention provides a fifth wheel that has a bearing plate that normally is free to tilt about an axis and locking means permitting the operator to lock the bearing plate against tilting about said axis.

When a tractor moves a semi-trailer, means must be provided that allow either the bearing plate at the forward end of the trailer or the bearing plate of the fifth wheel to tilt so that the two plates maintain full surface contact as the tractor and semi-trailer move along the road.

Many semi-trailers are equipped with a non-tilting forward bearing plate and the fifth wheel carried by the tractor has a bearing plate that tilts on an axis carried by the trunnions bolted to the chassis of the semi-trailer.

The invention enables a tractor having a fifth wheel designed for use with semi-trailers having a fixed bearing plate at the forward end to move a semi-trailer having a tilting bearing plate by using the tilt locking mechanism on the fifth wheel.

The object of the invention is to enable a tractor equipped with a fifth wheel having a bearing plate that tilts when trailing one type of semi-trailer to trail other types of semi-trailers by locking the tilting mechanism.

In the form of the invention here shown,

FIGURE 1 shows a tractor, a semi-trailer, and the fifth wheel which enables the tractor to draw the trailer.

FIGURE 2 shows, in elevation, one form of fifth wheel having a tilting fifth wheel plate.

FIGURE 3 shows, in elevation, an end view of one set of trunnions of the fifth wheel shown in FIGURE 2.

FIGURE 4 shows, in elevation, one form of the tilt lock that can be attached to the fifth wheel shown in FIGURES 2 and 3.

FIGURE 5 is a top view of the locking device shown in FIGURE 4.

FIGURE 6 shows in section along lines 6—6 in FIGURE 3 the fifth wheel shown in FIGURES 2 and 3 with the tilt locking device shown in FIGURES 4 and 5 in place.

In these drawings showing one application of the invention, 1 indicates a tractor drawing a semi-trailer 2 which engages a fifth wheel 3 carried by the tractor.

In FIGURES 2 and 3, showing a conventional fifth wheel used in moving a semi-trailer having a fixed bearing plate that rests on the fifth wheel, 4 indicates one of the trunnions carried by the tractor, 5 the fifth wheel bearing plate upon which semi-trailer bearing plate 6 rests. The plate 7 extends downward from the fifth wheel plate 5. The shaft 8 extends thru holes in the two plate supports 7 and the trunnion 4 and forms the axis about which the fifth wheel plate normally tilts.

Trunnion 4 may have a base portion 9 having holes 10 for bolts, not shown, that attach the trunnion to the frame of the tractor.

When the tractor equipped with this fifth wheel is called upon to draw a semi-trailer equipped with a tilting front plate, the tilting lock shown in FIGURES 4 and 5 is attached to the conventional fifth wheel to prevent tilting of fifth wheel plate 5. A tension piece 12 which may have a depressed circular area, or socket, 13 that facilitates locating the piece relative to the end 14 of the shaft 8 has flanges 15. A rear tension piece 16 has flanges 17. Wedges 18 are pushed into place. Bolts 21 extending thru flanges 15 and 17 permit drawing the wedges closer together. Each wedge bears against the under side of the plate support 7 and the top of trunnion 4.

When a tractor equipped with a fifth wheel designed to draw semi-trailers having a fixed bearing plate is called upon to move a semi-trailer having a bearing plate that tilts, the operator places tension piece 16 behind the trunnion, puts the wedges 18 in place, and tension piece 12 in front of the trunnion, then inserts and draws up bolts 21.

Now the fifth wheel plate does not tilt.

I claim:

1. A fifth wheel having trunnions, a shaft supported on said trunnions, a fifth wheel plate supported on said shaft and normally free to tilt thereon, the distance between the under side of said plate and the upper surface of said trunnion decreasing as the shaft is approached, and tilt locking means comprising wedges that can be inserted between the trunnion and the fifth wheel plate at each side of said shaft, tension bars that can be placed in front and behind said trunnions, and means to draw said wedges toward said tension bars until each wedge engages both the trunnion and the fifth wheel plate to prevent said plate from tilting.

2. In a fifth wheel with tilt locking means described in claim 1, a recessed area in one tilt bar permitting the location of said tilt bar relative to the end of said shaft to facilitate the assembly of the wedge and the tension bars.

References Cited by the Examiner

UNITED STATES PATENTS

| 1,407,338 | 2/1922 | Skiles | 188—32 |
| 2,418,279 | 4/1947 | Sax et al. | 188—32 |
| 2,602,674 | 7/1952 | Harris | 280—438 |
| 2,749,144 | 6/1956 | Kayler | 280—438 |
| 2,858,906 | 11/1958 | Minick | 188—32 |
| 2,994,546 | 8/1961 | Cooper | 280—111 |

LEO FRIAGLIA, *Primary Examiner.*